US008988711B2

(12) United States Patent
Iida

(10) Patent No.: US 8,988,711 B2
(45) Date of Patent: Mar. 24, 2015

(54) NON-TRANSITORY COMPUTER READABLE RECORDING MEDIUM STORING PRINT JOB GENERATING PROGRAM, PRINT JOB GENERATING DEVICE, AND PRINT SYSTEM FOR PERFORMING POST-PROCESSING IN ACCORDANCE WITH SELECTED POST-PROCESSING FUNCTIONS

(75) Inventor: Naoyuki Iida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 205 days.

(21) Appl. No.: 13/456,832

(22) Filed: Apr. 26, 2012

(65) Prior Publication Data

US 2012/0287463 A1 Nov. 15, 2012

(30) Foreign Application Priority Data

May 12, 2011 (JP) .................. 2011-106996

(51) Int. Cl.
*G06K 15/02* (2006.01)
*G06F 3/12* (2006.01)
*H04N 1/00* (2006.01)

(52) U.S. Cl.
CPC ............ *G06F 3/1205* (2013.01); *G06F 3/1253* (2013.01); *G06F 3/1264* (2013.01); *G06F 3/1282* (2013.01); *G06F 3/1285* (2013.01); *H04N 1/00222* (2013.01); *G06F 3/1275* (2013.01); *H04N 2201/3222* (2013.01); *H04N 2201/3216* (2013.01)
USPC .......................... 358/1.15; 358/1.13; 358/1.14

(58) Field of Classification Search
USPC ....................... 358/1.13, 1.14, 1.15
See application file for complete search history.

(56) References Cited

U.S. PATENT DOCUMENTS

| 7,777,907 | B2 * | 8/2010 | Anno et al. ................... 358/1.15 |
| 2006/0238793 | A1 * | 10/2006 | Akashi et al. ................ 358/1.13 |
| 2007/0127050 | A1 * | 6/2007 | Iwata et al. ................... 358/1.13 |
| 2008/0007758 | A1 * | 1/2008 | Miyashita ..................... 358/1.14 |

(Continued)

FOREIGN PATENT DOCUMENTS

JP 2006308692 A 11/2006
JP 2011034553 A 2/2011

OTHER PUBLICATIONS

English language abstract for US-20110002006 corresponds to JP-2011034553.

(Continued)

*Primary Examiner* — Fred Guillermety
*Assistant Examiner* — Edwin S Leland, III
(74) *Attorney, Agent, or Firm* — Harness, Dickey & Pierce, P.L.C.

(57) ABSTRACT

A non-transitory computer readable recording medium stores a print job generating program that causes a computer to perform as a setting unit, and a print job generating unit that generates a print job, based on a content of setting that is set using the setting unit by a user. In a print system environment that executes a process based on the print job, a first setting for not performing a first process, regardless of a print setting included in the print job, has been made in the print system environment for a first function of a first post-processing device included in an image forming device. The setting unit allows the user to set, alternatively to the first process, a second process performed by a second function of a second post-processing device included in the print system environment.

7 Claims, 12 Drawing Sheets

(56) References Cited

U.S. PATENT DOCUMENTS

2008/0030756 A1* 2/2008 Carney et al. ............... 358/1.13
2010/0073706 A1* 3/2010 Chan .......................... 358/1.15
2010/0182629 A1* 7/2010 Evan et al. .................. 358/1.15
2011/0002006 A1* 1/2011 Toriumi ...................... 358/1.15

OTHER PUBLICATIONS

English language abstract for US-7,777,907 corresponds to JP-2006308692.

* cited by examiner

FIG.3

JOB TICKET SETTING

☐ STAPLING FUNCTION

ⓧ STAPLING FUNCTION OF SELECTED PRINTER IS NOT AVAILABLE.
REASON: STAPLER IS RUNNING OUT OF STAPLES

STAPLE POSITION: | UPPER LEFT ▽ |

☑ HOLE-PUNCHING FUNCTION
NUMBER OF HOLES: | 2 HOLES ▽ |

☐ FOLDING FUNCTION
TYPE OF FOLDING: | Z-FOLDING ▽ |

☐ PAPER EJECTION TRAY
TRAY: | TRAY 1 ▽ |

☐ PERFECT BINDING FUNCTION
PAPER FEED TRAY FOR PERFECT BINDING: | TRAY ABOVE INSERTER OF PERFECT BINDING DEVICE ▽ |

| STAPLING FUNCTION |
|---|
| NOT SET |
| UPPER-LEFT AUTOMATIC |
| 2 POSITIONS IN LEFT |
| 2 POSITIONS AT CENTER |
| OFF |

| HOLE-PUNCHING FUNCTION |
|---|
| NOT SET |
| 1 HOLE |
| 2 HOLES |
| 3 HOLES |
| OFF |

| FOLDING FUNCTION |
|---|
| NOT SUPPORTED |
| OFF |

| PAPER EJECTION TRAY |
|---|
| NOT SET |
| TRAY 1 |
| TRAY 2 |
| TRAY 3 |
| OFF |

| PERFECT BINDING FUNCTION |
|---|
| NOT SET |
| TRAY ABOVE INSERTER OF PERFECT BINDING DEVICE |
| TRAY BELOW INSERTER OF PERFECT BINDING DEVICE |
| TRAY 1 |
| TRAY 2 |
| TRAY 3 |
| OFF |

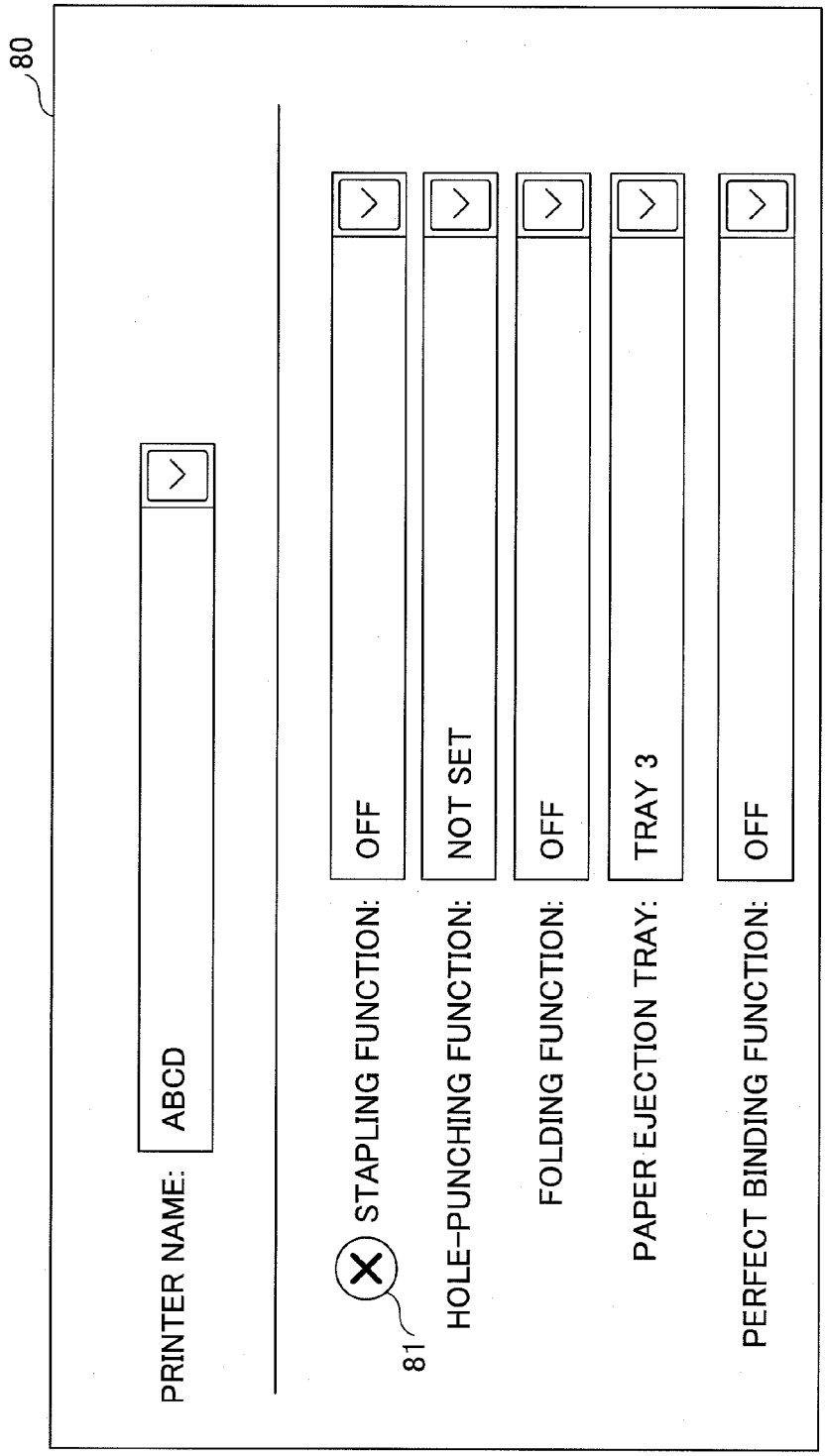

FIG.8

JOB TICKET SETTING

☑ STAPLING FUNCTION

⚠ STAPLING FUNCTION OF SELECTED PRINTER IS NOT AVAILABLE.
REASON: STAPLER IS RUNNING OUT OF STAPLES
PLEASE TURN ON STAPLING FUNCTION, IF STAPLING PROCESS IS TO BE DESIGNATED IN POST-PROCESS

POST-PROCESSING DEVICE NAME: [STAPLER ABC]   [SELECT POST-PROCESSING DEVICE] ~101

STAPLE POSITION: [UPPER LEFT ▽]   102~☑ RESTORE ORIGINAL SETTING AFTER PROCESSING

☑ HOLE-PUNCHING FUNCTION

NUMBER OF HOLES: [2 HOLES ▽]

☑ FOLDING FUNCTION

⚠ FOLDING FUNCTION OF SELECTED PRINTER IS NOT AVAILABLE.
REASON: THERE IS NO FOLDING FUNCTION
PLEASE TURN ON FOLDING FUNCTION, IF FOLDING PROCESS IS TO BE DESIGNATED IN POST-PROCESS

POST-PROCESSING DEVICE NAME: [FOLDING DEVICE_XYZ]   [SELECT POST-PROCESSING DEVICE] ~101

TYPE OF FOLDING: [Z-FOLDING ▽]   102~☐ RESTORE ORIGINAL SETTING AFTER PROCESSING

☐ PAPER EJECTION TRAY

TRAY: [TRAY 1 ▽]

☐ PERFECT BINDING FUNCTION

⚠ PERFECT BINDING FUNCTION OF SELECTED PRINTER IS NOT AVAILABLE.
REASON: CANCELLED BY INSTRUCTION OF ADMINISTRATOR
PLEASE TURN ON PERFECT BINDING FUNCTION, IF PERFECT BINDING PROCESS IS TO BE DESIGNATED IN POST-PROCESS

POST-PROCESSING DEVICE NAME: [          ]   [SELECT POST-PROCESSING DEVICE]

102~☐ RESTORE ORIGINAL SETTING AFTER PROCESSING

PAPER FEED TRAY FOR PERFECT BINDING: [TRAY ABOVE INSERTER OF PERFECT BINDING DEVICE ▽]

```
JOBTICKET
JobName PRESS123

STAPLING FUNCTION: OFF
NAME OF ALTERNATIVE STAPLER: STAPLER_ABC
ALTERNATIVE STAPLING FUNCTION: UPPER LEFT

JobEnd PRESS123
```

→

(B)

```
JOBTICKET
JobName PRESS123

STAPLING FUNCTION: UPPER LEFT

JobEnd PRESS123
```

NON-TRANSITORY COMPUTER READABLE RECORDING MEDIUM STORING PRINT JOB GENERATING PROGRAM, PRINT JOB GENERATING DEVICE, AND PRINT SYSTEM FOR PERFORMING POST-PROCESSING IN ACCORDANCE WITH SELECTED POST-PROCESSING FUNCTIONS

BACKGROUND OF THE INVENTION

1. Field of the Invention

An embodiment of the present invention relates to a print job generating program, a print job generating device, and a print system.

2. Description of the Related Art

An image forming device and its control method have conventionally been known such that, when a finisher (a post-processing device) connected in-line to a print device (an image forming device) becomes unavailable, the image forming device can transfer post-processing to another finisher (c.f. Patent Document 1 (Japanese Published Unexamined Application No. 2006-308692)).

Patent Document 1 discloses that, when an error is detected in the in-line finisher of the image forming device, the image forming device searches for a near-line finisher that can substitute a finishing process. When the image forming device finds a near-line finisher that can substitute the finishing process, the image forming device transfers the finishing process to the near-line finisher by generating job control information for the near-line finisher and transmitting the job control information.

Further, Patent Document 1 discloses that the in-line finisher is connected in-line to the image forming device, and the near-line finisher is connected to a network.

Patent Document 1 discloses that, when an error is detected in the in-line finisher of the image forming device, prior to processing a print job, the image forming device transfers the finishing job to the near-line finisher.

However, there has been a problem for the configuration disclosed in Patent Document 1 that it is not possible to generate a print job that utilizes a finishing process, as a print job for the image forming device. Here, an error has been detected in the in-line finisher of the image forming device. Further, the configuration disclosed in Patent Document 1 has a problem that it is not possible to generate a print job that utilizes a finishing process, as a print job for an image forming device which does not include an in-line finisher.

According to the configuration disclosed in Patent Document 1, when the image forming device generates a print job that utilizes a finishing process, the image forming device only considers a condition of an in-line finisher of the image forming device and notifies a user of whether a finishing process may be utilized. Namely, there has been a problem that the image forming device notifies the user of whether the finishing process may be utilized, without considering the whole printing system.

The embodiment has been developed in view of the above described problems. An objective of the embodiment is to provide a print job generating program, a print job generating device, and a print system that can notify a user of whether post-processing is available while considering the whole print system.

SUMMARY OF THE INVENTION

In one aspect, there is provided a non-transitory computer readable recording medium storing a print job generating program that causes a computer to perform as a setting unit; and a print job generating unit that generates a print job, based on a content of setting that is set using the setting unit by a user.

In a print system environment that executes a process based on a print job including information about an image to be printed and instruction information that specifies a content of post-processing, a first setting for not performing a first process, regardless of a print setting included in the print job, has been made in the print system environment for a first function of a first post-processing device included in an image forming device.

The setting unit allows the user to set, alternatively to the first process of the first function, a second process performed by a second function of a second post-processing device included in the print system environment.

In another aspect, there is provided a print job generating device including a setting unit; and a print job generating unit that generates a print job, based on a content of setting that is set using the setting unit by a user.

In a print system environment that executes a process based on a print job including information about an image to be printed and instruction information that specifies a content of post-processing, a first setting for not performing a first process, regardless of a print setting included in the print job, has been made in the print system environment for a first function of a first post-processing device included in an image forming device.

The setting unit allows the user to set, alternatively to the first process of the first function, a second process performed by a second function of a second post-processing device included in the print system environment.

In another aspect, there is provided a print system including a print job generating device; and a process management device.

Here, the print job generating device includes a setting unit; and a print job generating unit that generates a print job, based on a content of setting that is set using the setting unit by a user.

In a print system environment that executes a process based on a print job including information about an image to be printed and instruction information that specifies a content of post-processing, a first setting for not performing a first process, regardless of a print setting included in the print job, has been made in the print system environment for a first function of a first post-processing device included in an image forming device.

The setting unit allows the user to set, alternatively to the first process of the first function, a second process performed by a second function of a second post-processing device included in the print system environment.

Further, a method, a device, a system, a computer program, a non-transitory recording medium, and a data structure, to which a component, a representation, or an arbitrary combination of components of the embodiments are applied, are also effective as embodiments of the present invention.

According to the embodiments, the print job generating program, the print job generating device, and the print system that can notify the user of whether the post-processing is available by considering the whole print system can be provided.

Other objects, features and advantages of the present invention will become more apparent from the following detailed description when read in conjunction with the accompanying drawings.

BRIEF DESCRIPTION OF THE DRAWINGS

FIG. 3 is an image diagram of an example of a job ticket setting screen;

FIG. 5B is a diagram showing selectable items for functions;

FIG. 6 is an image diagram of an example of an overwrite print setting screen, on which print setting is overwritten by a process administrator;

FIG. 8 is an image diagram of an example of a job ticket setting screen;

FIG. 11 is a configuration diagram of an example of a job ticket.

DETAILED DESCRIPTION OF THE PREFERRED EMBODIMENTS

Hereinafter, the embodiment of the present invention is explained by referring to the accompanying figures. Here, the print system described below is for facilitating understanding of the embodiment. The embodiment is not limited to the print system below.

(Overall Configuration of Print System)

Figure 1:
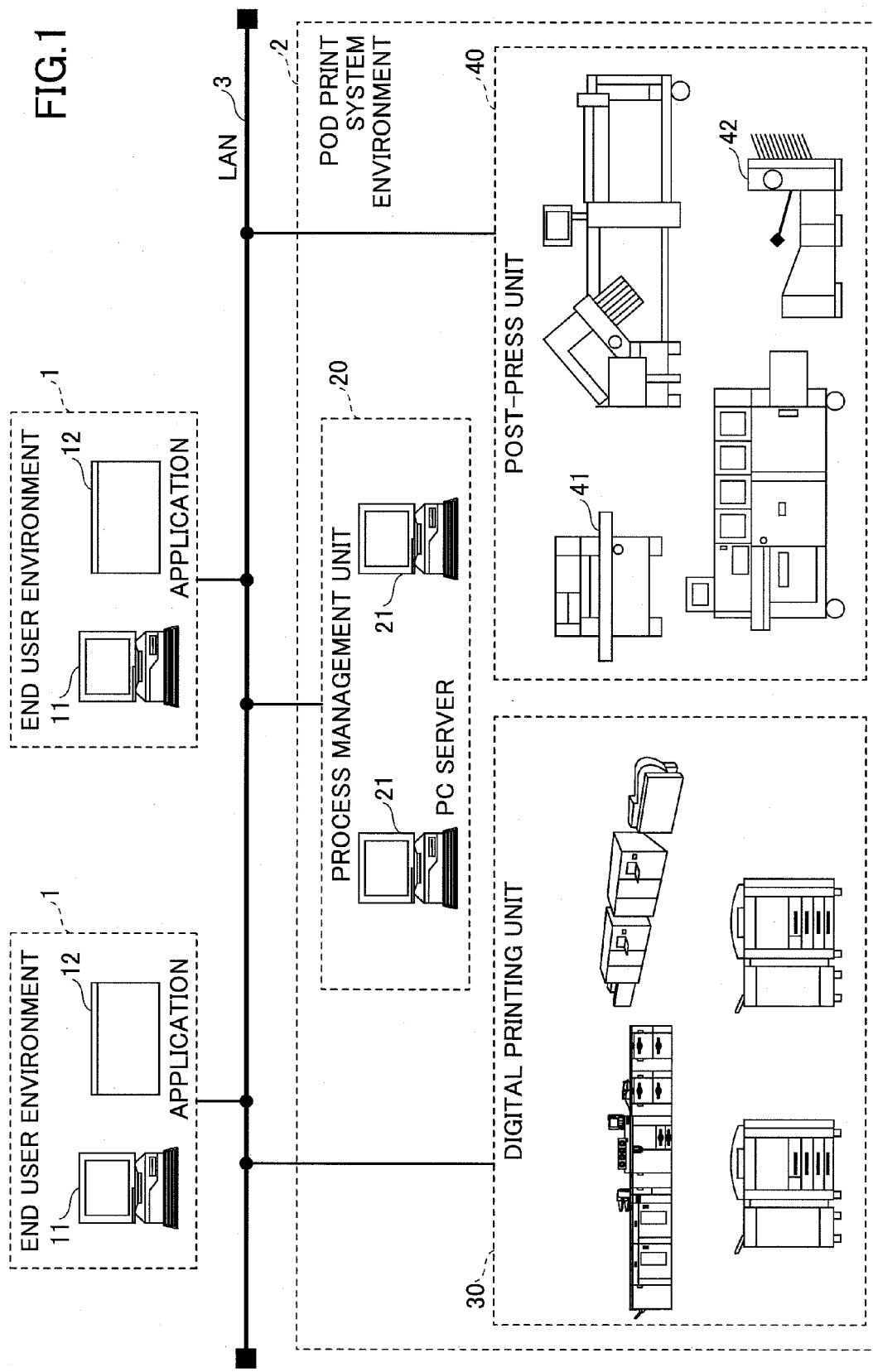
FIG. 1 is a block diagram showing an example of an overall configuration of a print system according to an embodiment.

FIG. 1 is a block diagram showing an example of an overall configuration of the print system according to the embodiment. The print system includes one or more end user environments 1 and a print on demand (POD) print system environment 2, which are connected to a network 3, such as a LAN.

Each of the end user environments 1 is, for example, an environment including a client PC 11, which is connected to a corporate intranet. In the client PC 11, an application 12 for a POD printing service is installed. The client PC 11 can generate a print job. The application 12 is an example of a print job generating program.

The application 12 can execute an imposition function for attaching plural logical images to a page, or an image editing function for adding information, such as a header, a footer, or a page number. Further, the application 12 can specify an instruction for hole-punching and an instruction for stapling for printing and bookbinding.

The POD print system environment 2 includes a process management unit 20, a digital printing unit 30, and a post-press unit 40, which are connected online. In the POD print system environment 2, the process management unit 20 instructs the digital printing unit 30 and the post-press unit 40 to execute tasks. The process management unit 20 centrally manages the workflow of the POD print system environment 2.

The process management unit 20 receives a print job (a print order) from the end user environment 1, and stores the print job. Further, the process management unit 20 can construct a workflow from the tasks to be executed by the corresponding units, based on the print job from the end user environment 1. In addition, the process management unit 20 can efficiently perform scheduling of the tasks to be executed by the digital printing unit 30, the post-press unit 40, and operators. Furthermore, when an error occurs during an automatic operation of the print system, the process management unit 20 may notify the operator of the occurrence of the error. In general, the process management unit 20 includes at least one PC server 21.

The digital printing unit 30 includes a printer, such as a printer for production, a high-speed color inkjet printer, and a color/monochrome MFP. The digital printing unit 30 performs printing in accordance with instructions on the print job received from the process management unit 20. The digital printing unit 30 includes a printer that is directly connected to a finisher (a post-processing device), which is for performing post processing, such as paper folding, saddle stitching bookbinding, perfect binding, and hole-punching on a recording paper which has been printed.

The post-press unit 40 has a configuration which includes post-process devices, such as a paper folding device, a saddle stitching bookbinding device, a perfect binding device, a paper cutting device, a mail insertion device, and a collator, depending on work instructions on a post-press job received from the process management unit 20. Further, the post-press unit 40 performs finishing processes on the printed paper, which has been output from the digital printing unit 30. The finishing processes includes, for example, a folding process, a saddle stitching bookbinding process, a perfect binding process, a cutting process, a mail inserting process, and a collating process. The post-press unit 40 includes post-processing devices for performing post-processes after digital printing, such as a stapler 41 and a hole-punch device 42.

An end user, for example, edits an image, performs an imposition process, inserts text, and orders an execution of the post-process, by using the application 12 for the POD printing service from the client PC 11 in the end user environment 1. In this manner, the end user transmits a print job to the process management unit 20 in the POD print system environment 2. The print job includes order information, which is referred to as a job ticket, and print data. The job ticket is described in Job Definition Format (JDF) or the like.

The PC server 21 in the process management unit 20 instructs the digital printing unit 30 to perform printing and the post-press unit 40 to perform post-processing, in accordance with the information (print setting) included in the job ticket.

The established configuration of the digital printing unit 30 varies depending on the POD print system environment 2. However, in many cases, the digital printing unit 30 includes a combination of color or monochrome printers that can handle high-speed printing and that can print high-quality images. The printers can perform not only printing functions online, but also can perform post-processing online with finishers, which are directly connected to the printers.

(Hardware Configurations of Client PC and PC Server)

Figure 2:
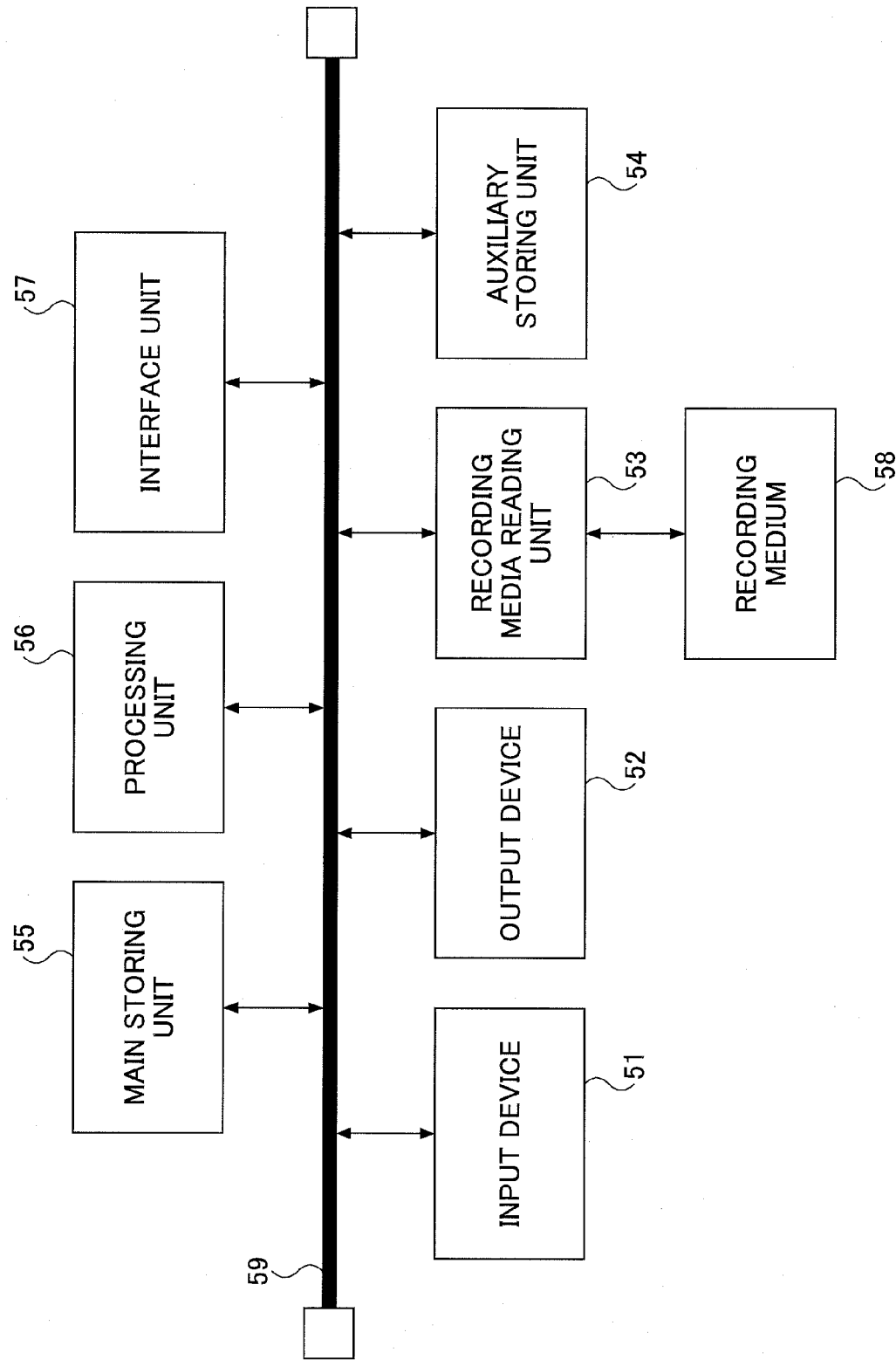
FIG. 2 is a hardware configuration diagram of an example of a PC.

The client PC 11 in the end user environment 1 can be realized, for example, by a PC 50 having a hardware configuration shown in FIG. 2. FIG. 2 is a hardware configuration diagram of an example of the PC 50. The PC 50 shown in FIG. 2 includes an input unit 51, an output unit 52, a recording media reading unit 53, an auxiliary storing unit 54, a main storing unit 55, a processing unit 56, and an interface unit 57, which are mutually connected through a bus 59.

The input unit 51 is, for example, a keyboard and a mouse. The input unit 51 is used for inputting various signals. The output unit 52 is, for example, a display device. The output unit 52 is used for displaying various windows and data. The interface unit 57 is, for example, a modem or a LAN card. The interface unit 57 is used for connecting the PC 50 to the network 3.

The application 12 for the POD printing service installed on the client PC 11 is, at least, a part of various programs that controls the PC 50. The application 12 may be distributed as a recording medium 58, or downloaded from the network 3.

As the recording medium 58, various types of recording media may be utilized. For example, as the recording medium 58, a recording medium, such as a CD-ROM, a flexible disk, or a magnetic optical disk, may be utilized. In such a recording medium, information is optically, electrically, or magnetically recorded. Further, as the recording medium 58, a semiconductor memory, such as a ROM, or a flash memory, may be utilized. In such a semiconductor memory, information is electrically recorded.

When the recording medium 58, in which the application 12 is recorded, is set up in the recording media reading unit 53, the application 12 is installed in the auxiliary storage unit 54 from the recording medium 58 through the recording media reading unit 53. Further, the application 12 that is downloaded from the network 3 or the like is installed in the auxiliary storage unit 54 through the interface device 57. The auxiliary storage unit 54 stores the installed application 12, necessary files, and data.

When the application 12 is executed, the main storage unit 55 retrieves the application 12 from the auxiliary storage unit 54 and stores the application therein. Then the processing unit 56 executes various processes (described later) in accordance with the application 12 stored in the main storage unit 55.

Similarly, the PC server 21 in the process management unit 20 is realized, for example, by the PC shown in FIG. 2. A processing unit 56 of the PC server 21 realizes various processes of the process management, in accordance with a process management program stored in a main storage unit 55 of the PC server 21.

(Setting of Job Ticket)

Here, in order to facilitate understanding of the embodiment, an example is explained, in which setting of a job ticket is performed by the application 12 for the conventional POD printing service in the end user environment 1. FIG. 3 is an image diagram of an example of an image of a conventional job ticket setting screen. The job ticket setting screen 60 of FIG. 3 is an example of a setting screen for setting a job ticket, when a print job is input, for example, to the print system shown in FIG. 1.

Through the job ticket setting screen 60, a job ticket can be set by selecting functions of a finisher, which is directly connected to the printer. For example, the job ticket setting screen 60 of FIG. 3 shows that a hole-punch function, a function of a paper ejection tray, and a perfect binding function, which are the functions of the finisher directly connected to the selected printer, may be utilized.

Further, in the job ticket setting screen 60 of FIG. 3, the stapling function is displayed with half brightness and the stapling function is not selectable. This is because the finisher of the selected printer is running out of staples. Furthermore, in the job ticket setting screen 60 of FIG. 3, the folding function is displayed with half brightness and the folding function is not selectable. This is because the finisher which is directly connected to the selected printer does not include a folding (paper folding) function.

For example, the application 12 for the POD printing service that is installed in the client PC 11 in the end user environment 1 obtains information about functions and a status from a printer in the digital printing unit 30 in the POD print system environment 2 through the network 3. For example, the application 12 may obtain the information about the functions and the statuses from the printer using the Simple Network Management Protocol (SNMP) of the TCP/IP communication.

For example, when error information or warning information about a finisher directly connected to a printer selected by the digital printing unit 30 is reported, a job ticket may not be set in the conventional job ticket setting screen 60.

For example, since it is notified that the finisher of the selected printer has been running out of the staples by using the SNMP, the staple function is not selectable in the job ticket setting screen 60 of FIG. 3. At this time, if the post-press unit 40 includes a stapler that can be individually utilized, the administrator may want the stapler to perform a stapling process. However, with the conventional job ticket setting screen 60, a job ticket may not be set, if an error occurs in the staple function of the finisher that is directly connected to the selected printer.

Further, with the conventional job ticket setting screen 60, a function which is not included in the finisher that is directly connected to the printer selected by the digital printing unit 30 may not be set in a job ticket. For example, since it is reported that the finisher of the selected printer does not have a folding function by utilizing the SNMP, the folding function is not selectable in the job ticket setting screen 60 of FIG. 3.

At this time, if the post-press unit 40 includes a paper folding device that can be individually utilized, the administrator may want the paper folding device to perform a paper folding process. However, with the conventional job ticket setting screen 60, a job ticket may not be set, since the finisher that is directly connected to the selected printer does not have a folding function.

Further, when a finisher which is directly connected to the printer selected by the digital printing unit 30 includes a particular function and the post-press unit 40 includes a device that has the particular function, the particular function of the device included in the post-press unit 40, which is not the particular function of the finisher, may not be set in the job ticket by using the conventional job ticket setting screen 60.

Since it is reported that the finisher of the selected printer includes a perfect binding function by using the SNMP, with the job ticket setting screen 60 of FIG. 3, a perfect binding function of another device, which can be individually utilized and included in the post-press unit 40, is not selectable.

As described above, with the conventional job ticket setting screen 60, only the availability of the functions of the finisher which is directly connected to the printer selected by the digital printing unit 30 may be reported to a user. Namely, with the conventional job ticket setting screen 60, it is not possible to notify the user of whether post-processing functions, such as a function of a post-processing device included in the post-press unit 40 or a function of a finisher directly connected to a printer being included in the digital printing unit 30 but not being selected, are available by taking into consideration the whole print system.

(Overwrite Print Setting of Job Ticket in Process Management Unit 20)

Figure 4:
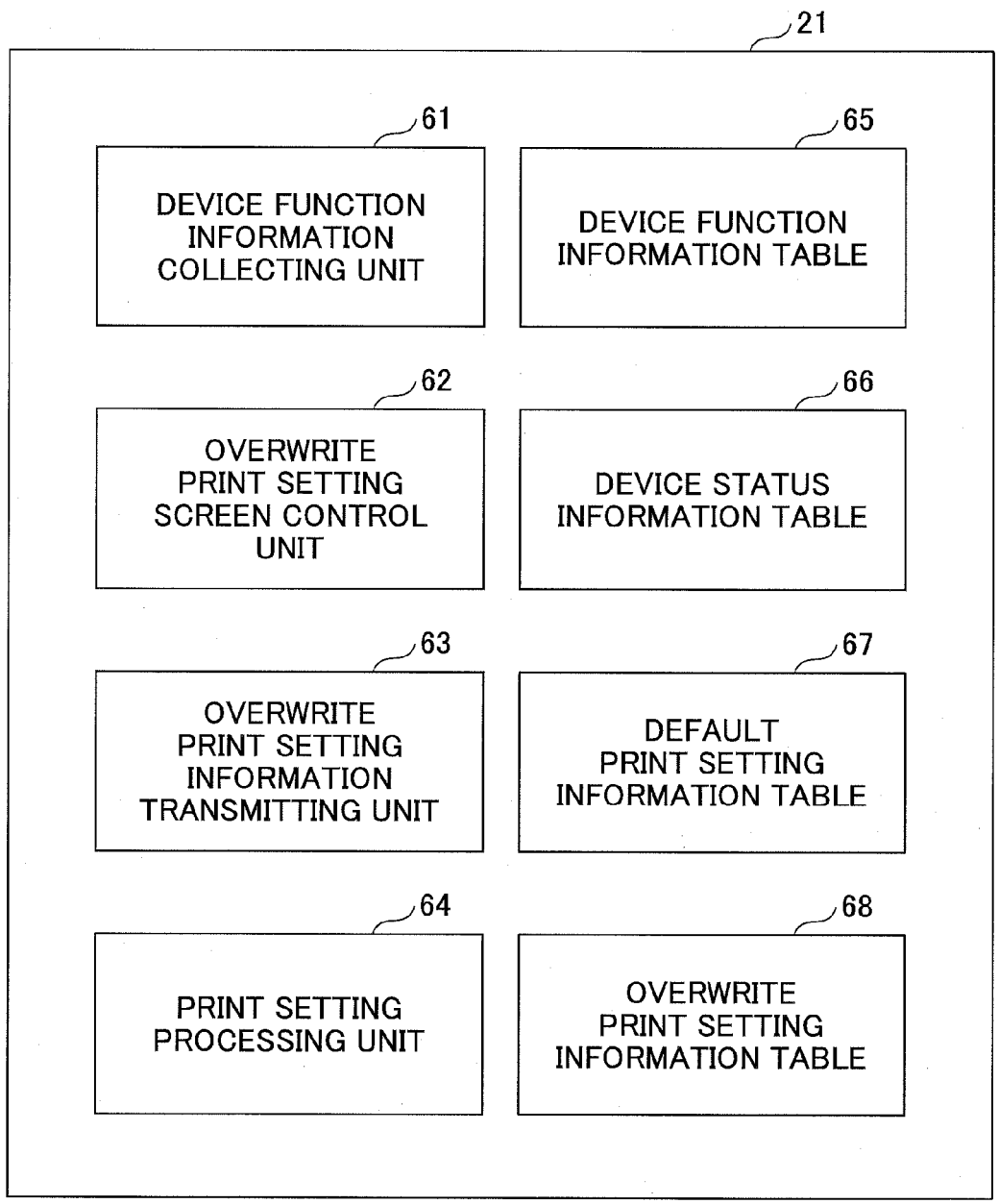
FIG. 4 is a processing block diagram of an example of a PC server.

The PC server 21 in the process management unit 20 is realized, for example, by processing blocks shown in FIG. 4. FIG. 4 is a processing block management program is installed in the PC server 21. The PC server 21 realizes the following units by executing the process management program. Namely, the PC server 21 realizes a device function information collecting unit 61, an overwrite print setting screen control unit 62, an overwrite print setting information transmitting unit 63, a print setting processing unit 64, a device function information table 65, a device status information table 66, a default print setting information table 67, and an overwrite print setting information table 68.

The device function information collecting unit 61 collects device function information from the printers included in the digital printing unit 30 and the post-processing devices included in the post-press unit 40. The device function information collecting unit 61 obtains the device function information from Management Information Base (MIB) information of each of the devices, such as the printers and the post-processing devices, using, for example, the SNMP of the TCP/IP communication. The device function information collecting unit 61 stores the collected device function information in the device function information table 65.

The overwrite print setting screen control unit 62 outputs an overwrite print setting screen (described later) to the output device 52 and allows the administrator to perform an overwrite print setting. Here, the overwrite print setting is set in addition to default print settings of a printer or a virtual printer. The overwrite print setting forcibly overwrites a print setting from the end user environment 1 in the PC server 21 included in the process management unit 20.

The overwrite print setting information transmitting unit 63 transmits a content of the overwrite print setting, which has been set from an overwrite print setting screen (described later), to the end user environment 1 as overwrite print setting information. Further, the print setting processing unit 64 forcibly overwrites a print setting included in a job ticket from the end user environment 1, in accordance with the overwrite print setting. The print setting processing unit 64 instructs the digital printing unit 30 to print and instructs the post-press unit 40 to perform post-processing, in accordance with the print setting.

The device function information table 65 stores the device function information collected from the devices. For example, the device function information represents, for each device, whether the device includes particular functions. The device state information table 66 stores the device state information collected from the devices. For example, the device state information represents, for each function of each device, whether the function is in a normal state or in an abnormal state, such as an error state or a warning state. The default print setting information table 67 stores a content of a default print setting as default print setting information. The overwrite print setting information table 68 stores a content of an overwrite print setting, which is set from the overwrite print setting screen (described later), as overwrite print setting information.

Figure 5A:
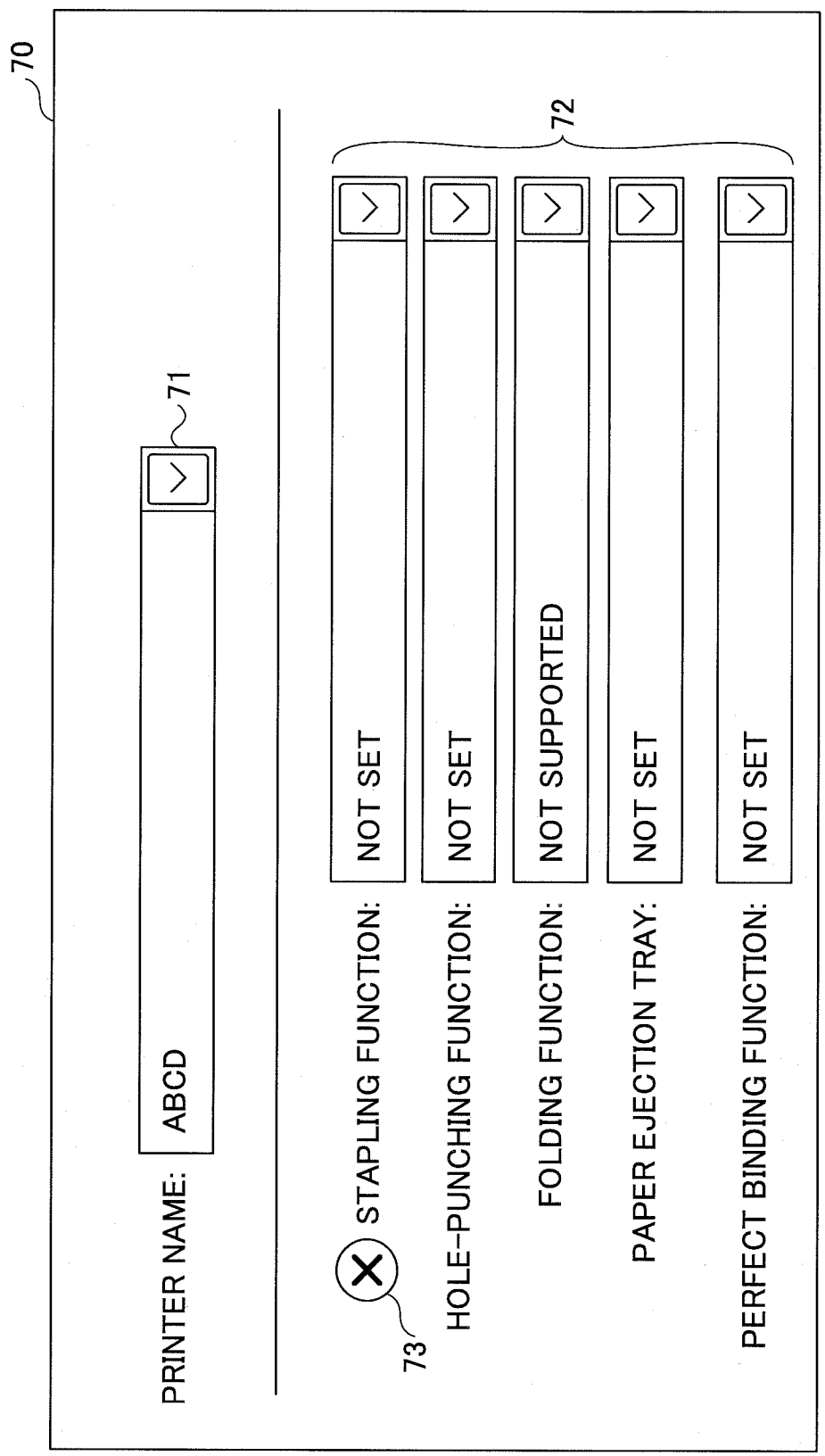
FIG. 5A is an image diagram of an example of an overwrite print setting screen.

FIG. 5A is an image diagram of an example of the overwrite print setting screen 70. FIG. 5B shows, for each function, selectable items. As shown in FIG. 5A, the overwrite print setting screen 70 includes a field 71 for selecting a printer and fields 72 for selecting an item for each of the functions.

The overwrite print setting screen 70 of FIG. 5A shows a function for overwriting a print setting, when a printer "ABCD" is selected. Here, an error icon 73 is displayed for the stapling function. The error icon 73 is displayed when a state of a function of the printer is not normal.

As shown in FIG. 5B, for example, the administrator can select an item for each function. For example, for the stapling function, the administrator can select one item from the items "not set," "upper-left automatic," "2 positions in left," "2 positions at center," and "OFF." The item of "OFF" has not been included in the conventional overwrite print setting screen. The item of "OFF" is a newly added item.

The item of "not set" indicates that the print setting is in accordance with the print setting included in a job ticket from the end user environment 1. Here, when a job ticket does not include a print setting, the print setting is in accordance with the default print setting. If the administrator wants to select, for example, "2 positions in left" from the selectable items of the stapling function while ignoring the print setting included in a job ticket from the end user environment 1, based on a condition of the POD print system environment 2, the administrator may select "2 positions in left" in the column for selecting the stapling function in the field 72.

An item of "not supported" indicates that the corresponding function is not included in the printer selected in the field 71. For example, in the overwrite print setting screen 70 in FIG. 5A, since the printer selected in the field 71 does not include a folding function, the item of "not supported" is selected.

The item of "OFF" indicates that the corresponding function is not executed, regardless of the print setting included in a job ticket from the end user environment 1.

FIG. 6 is an image diagram of an example of the overwrite print setting screen, on which a print setting is overwritten by the administrator. The overwrite print setting screen 80 in FIG. 6 indicates that the stapling function, the folding function, and the perfect binding function are not executed, regardless of the print setting included in a job ticket from the end user environment 1.

Further, the overwrite print setting screen 80 indicates that the hole-punching function is executed in accordance with the print setting included in the job ticket from the end user environment 1. Furthermore, the overwrite print setting screen 80 indicates that a tray 3 is forcibly selected, regardless of the print setting included in the job ticket from the end user environment 1.

Additionally, the item of "OFF" is explained. In the overwrite print setting screen 60 of FIG. 6, the error icon 81 is displayed. Here, the error icon 81 indicates that the status of the stapling function is abnormal. Therefore, in this condition, the stapling function may not be selected even in the job ticket setting screen 60 in the end user environment 1.

On the other hand, when the post-press unit 40 includes a stapler that can be individually utilized, the administrator may want the stapler to execute the stapling process. Thus, when the stapling process is to be executed by the stapler, which is included in the post-press unit 40 and can be individually utilized, the abnormal state of the stapling function in the job ticket setting screen 60 in the end user environment 1 can be ignored by selecting the item of "OFF."

In other words, in the job ticket setting screen 60 in the end user environment 1, a stapling function can be set, even if the state of the stapling function of the finisher directly connected to the printer is not normal.

Further, when the finisher of the selected printer does not include a folding function, a folding function cannot be set in the job ticket setting screen 60 in this condition. Therefore, similar to the case of the stapling function, when the folding process is to be executed by a folding device, which is included in the post-press unit 40 and can be individually utilized, it can be ignored in the job ticket setting screen 60 in the end user environment 1 that the finisher of the selected printer does not include a folding function by selecting the item of "OFF."

In other words, a folding function can be set in the job ticket setting screen 60 of the end user environment 1, even if the finisher directly connected to the printer does not include a folding function.

Further, when the finisher of the selected printer includes a perfect binding function, a perfect binding function of a perfect binding device, which is included in the post-press unit 40 and can be individually utilized, is not selectable in this condition.

On the other hand, the administrator may not want the finisher of the selected printer to be utilized, due to a maintenance purpose or a condition on charging, even if the finisher of the selected printer includes a perfect binding function. Thus, when the perfect binding process is to be executed by the perfect binding device, which is included in the post-press unit 40 and can be individually utilized, it can be ignored in the job ticket setting screen 60 in the end user environment 1 that the finisher of the selected printer includes the perfect binding function by selecting the item of "OFF."

In other words, in the job ticket setting screen 60 in the end user environment 1, it can be set so that the perfect binding process is to be executed by the perfect binding device, which is included in the post-press unit 40 and can be individually utilized, while ignoring the perfect binding function of the finisher of the selected printer.

(Job Ticket Setting in End User Environment 1)

Figure 7:
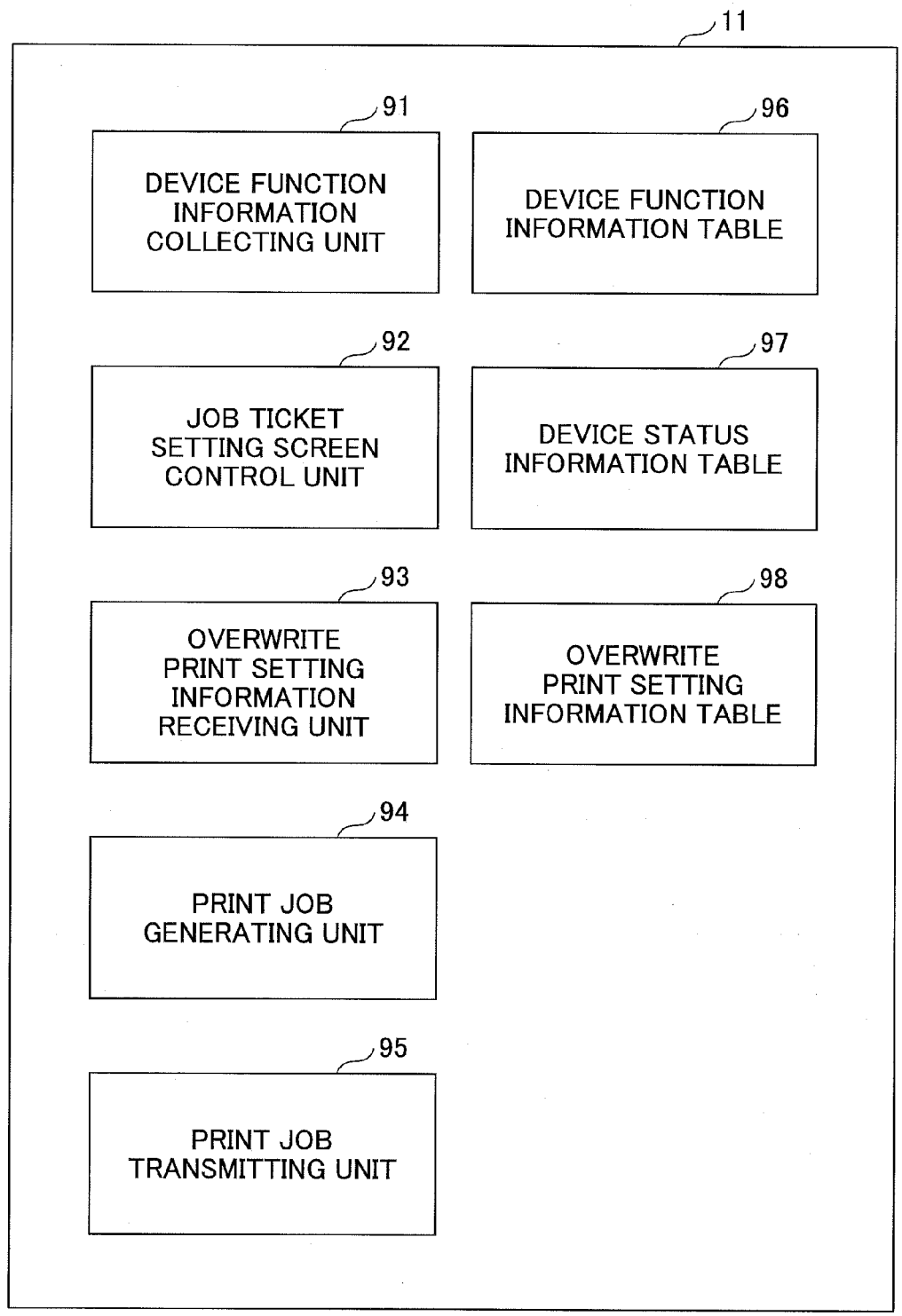
FIG. 7 is a processing block diagram of an example of a client PC.

The client PC 11 in the end user environment 1 is realized, for example, by the processing blocks shown in FIG. 7. FIG. 7 is a processing block diagram of an example of the client PC. The application 12 for the POD printing service is installed in the client PC 11. The client PC 11 realizes the following units by executing the application 12. Namely, the client PC 11 realizes a device function information collecting unit 91, a job ticket setting screen control unit 92, an overwrite print setting information receiving unit 93, a print job generating unit 94, a print job transmitting unit 95, a device function information table 96, a device status information table 97, and an overwrite print setting information table 98.

Similar to the device function information collecting unit 61, the device function information collecting unit 91 collects device function information from the printers included in the digital printing unit 30 and the post-processing devices included in the post-press unit 40. The device function information collecting unit 91 stores the collected device function information in the device function information table 96.

The job ticket setting screen control unit 92 outputs the job ticket setting screen (described later) to the output device 52 and the like, and allows a user to set a job ticket. The overwrite print setting information receiving unit 93 receives overwrite print setting information from the process management unit 20. The print job generating unit 94 generates a print job including the job ticket that has been set by the user. The print job transmitting unit 95 transmits the print job to the process management unit 20.

The device function information table 96 stores the device function information collected from the devices. The device status information table 97 stores the device status information collected from the devices. The overwrite print setting information table 98 stores the overwrite print setting information received from the process management unit 20.

FIG. 8 is an image diagram of an example of the job ticket setting screen. The job ticket setting screen 100 in FIG. 8 is an example of a setting screen for setting a job ticket, when a print job is input, for example, to the print system shown in FIG. 1.

With the job ticket setting screen 100, a function of the finisher directly connected to the printer can be selected and a job ticket can be set. In addition, with the job ticket setting screen 100, a finisher, which is included in the post-press unit 40 and can be individually utilized, can be selected and a job ticket can be set by utilizing the overwrite print setting information as described later.

For example, in the job ticket setting screen 100 in FIG. 8, since the finisher of the selected printer is running out of the staples, the stapling function is in an error state. In the conventional job ticket setting screen 60 shown in FIG. 3, the stapling function may not be set in the job ticket.

With the job ticket setting screen 100 in FIG. 8, it is possible to recognize in the process management unit 20 that the item of "OFF" is selected for the stapling function, based on the received overwrite print setting information. With this, it is possible to interpret that the post-press unit 40 includes a stapler that can be individually utilized, though the stapling function of the finisher directly connected to the printer may not process, because it is in the error state.

Therefore, in the job ticket setting screen 100 in FIG. 8, it is determined to accept a setting of the stapling function in the job ticket while the error state of the stapling function of the finisher directly connected to the selected printer is ignored. For example, in the job ticket setting screen 100 in FIG. 8, the on/off setting of the stapling function to the job ticket is enabled. For example, an end user is sent the following message: "please turn on the stapling function, if the stapling process is to be designated in the post-process."

Further, in the job ticket setting screen 100 in FIG. 8, since the finisher of the selected printer does not include a folding function (a paper folding function), the folding function is in an error state. In the conventional job ticket setting screen 60 shown in FIG. 3, the folding function may not be set in the job ticket.

In the job ticket setting screen 100 in FIG. 8, it is possible to recognize in the process management unit 20 that the item of "OFF" is selected for the folding function, based on the received overwrite print setting information. With this, it is possible to interpret that the post-press unit 40 includes a paper folding device that can be individually utilized, though the finisher directly connected to the selected printer does not include a folding function.

Therefore, in the job ticket setting screen 100 in FIG. 8, it is determined to accept the setting of the folding function to the job ticket, while the error state of the folding function of the finisher directly connected to the printer is ignored.

Further, in the job ticket setting screen 100 in FIG. 8, it is possible to recognize that the finisher of the selected printer includes the perfect binding function, but in the process management unit 20, the item of "OFF" is selected for the perfect binding function, based on the received overwrite print setting information. Therefore, in the job ticket setting screen 100 in FIG. 8, the perfect binding function is in an error state. In such a case, with the conventional job ticket setting screen 60 shown in FIG. 3, it is not possible to set the perfect binding function in the job ticket.

In the job ticket setting screen 100 in FIG. 8, it is possible to interpret that the administrator has canceled using the perfect binding function of the finisher of the selected printer for some reason. In the job ticket setting screen 100, for example, the end user is sent the message "the perfect binding function of the selected printer has been cancelled by the administrator," and it is determined to accept the setting of the perfect binding function of the stand-alone perfect binding device included in the post-press unit 40.

Figure 9:
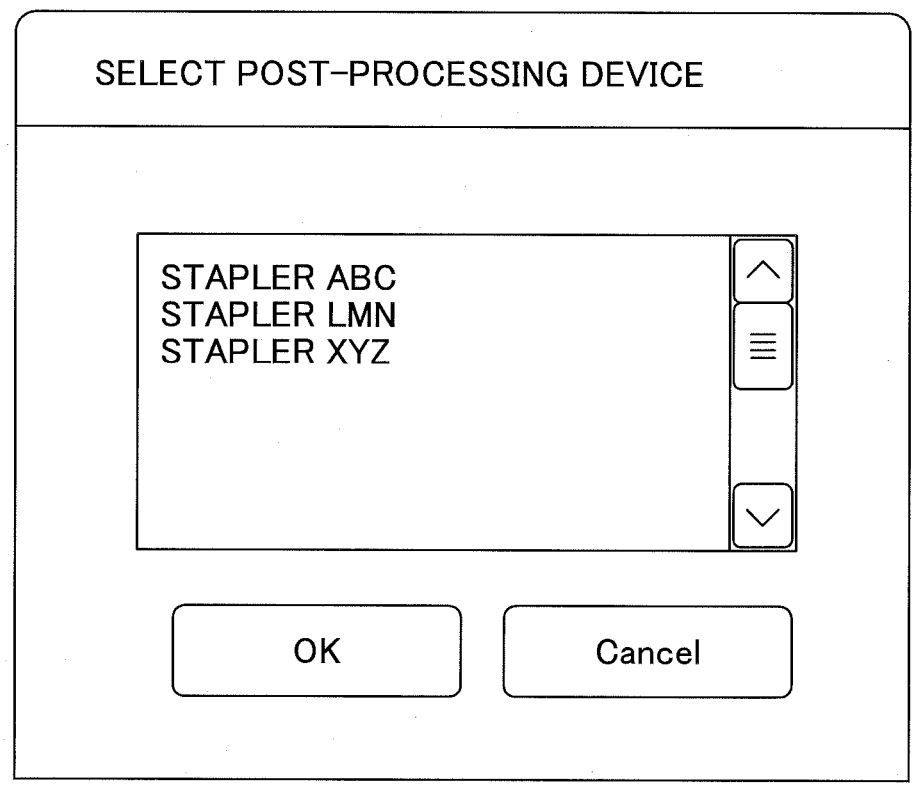
FIG. 9 is an image diagram of an example of a post-processing device selection list.

Further, when the setting of the finisher, which is included in the post-press unit 40 and can be independently utilized, is input through the job ticket setting screen 100 in FIG. 8, it is allowed to select a stand-alone finisher among the finishers included in the post-press unit 40, for example, from a post-processing device selection list shown in FIG. 9.

FIG. 9 is an image diagram of an example of the post-processing device selection list. As the post-processing device selection list, for example, a list registered in the process management unit 20 may be utilized. When one of the post-processing device selection buttons 101 is pressed in the job ticket setting screen 100 in FIG. 8, the post-processing device selection list of FIG. 9 is displayed. The post-processing device selection list may be registered in the end user environment 1.

The user is not always required to set the functions of the finishers, which are included in the post-press unit 40 and can be independently utilized, in the job ticket setting screen 100 in FIG. 8. The user may leave the corresponding columns blank, and let the administrator fill out the corresponding columns in the process management unit 20.

Figure 10:
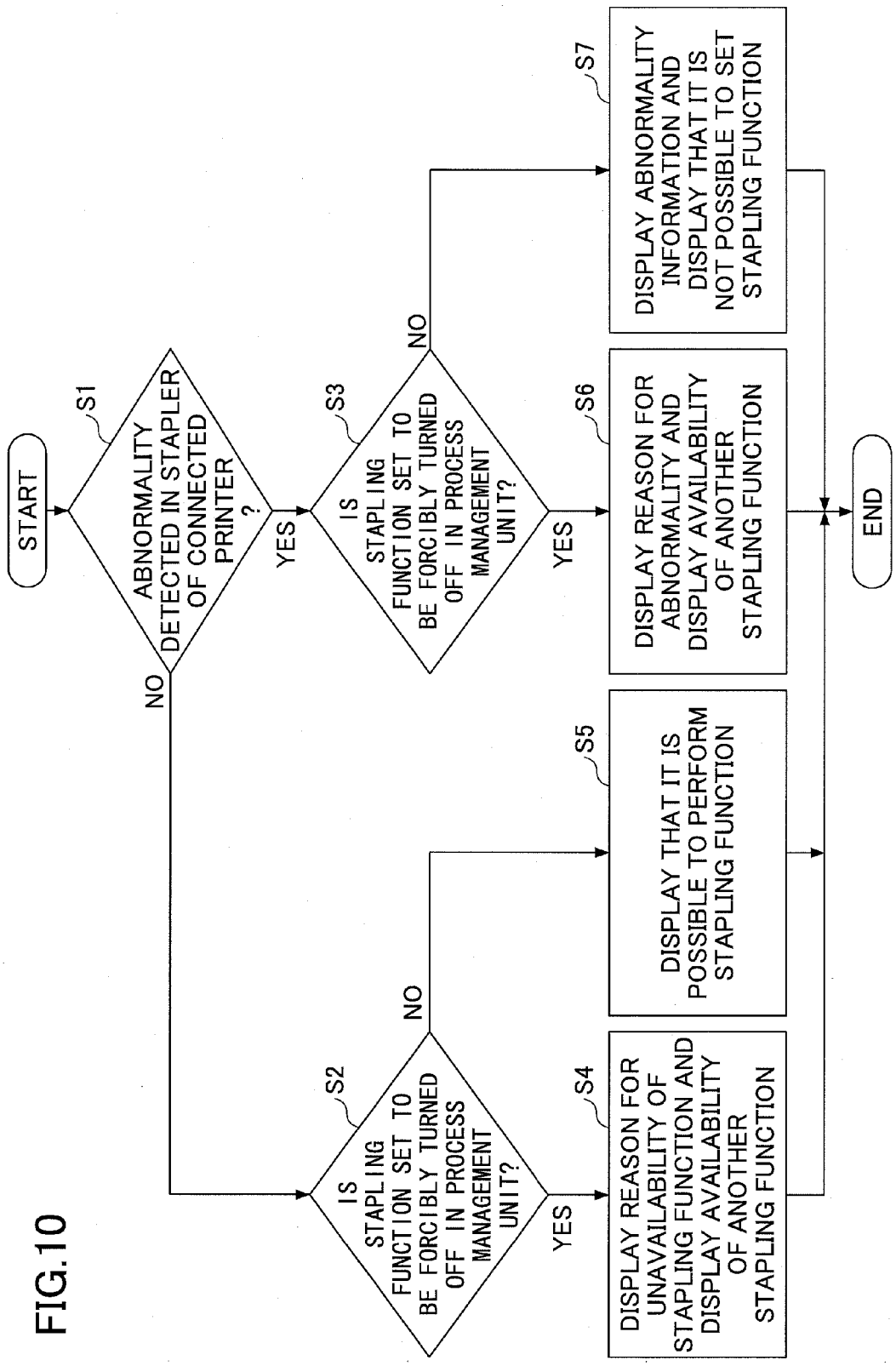
FIG. 10 is a flowchart of an example of a procedure of a job ticket setting screen control unit.

FIG. 10 is a flowchart of an example of a procedure of the job ticket setting screen control unit 92. For the flowchart of FIG. 10, processes for displaying the stapling function in the job ticket setting screen 100 in FIG. 8 are extracted and indicated. Since the processes for displaying other functions are similar, they are omitted.

At step S1, the job ticket setting screen control unit 92 determines whether there is abnormality in the stapling function (whether the stapling function is in an error state) of the finisher of the selected printer. When the job ticket setting screen control unit 92 determines that there is no abnormality in the stapling function of the finisher of the selected printer, the job ticket setting screen control unit 92 determines, at step S2, whether the item of "OFF" is selected for the stapling function in the process administration unit 20, based on the received overwrite print setting information.

When it is determined that the item of "OFF" is selected for the stapling function, the job ticket setting screen control unit 92 displays, at step S4, the reason why the stapling function of the finisher of the selected printer is not available (the stapling function is cancelled by the instruction of the administrator), and concurrently displays that it is possible to set a stapling function in the post-process.

Further, when it is determined that the item of "OFF" is not selected for the stapling function, the job ticket setting screen control unit 92 displays, at step S5, that the stapling function of the finisher of the selected printer is executable.

On the other hand, when it is determined, at step S1, that there is abnormality in the stapling function of the finisher of the selected printer, the job ticket setting screen control unit 92 determines, at step S3, whether the item of "OFF" is selected for the stapling function in the process administration unit 20, based on the received overwrite print setting information.

When the item of "OFF" is selected for the stapling function, the job ticket setting screen control unit 92 displays, at step S6, the reason for the abnormality (e.g., there are no staples), and concurrently displays that it is possible to set a stapling function in the post-process.

Further, when the item of "OFF" is not selected for the stapling function, the job ticket setting screen control unit 92 displays, at step S7, the reason for the abnormality (e.g., there are no staples), and concurrently displays that it is not possible to execute the stapling function of the finisher of the selected printer.

Incidentally, it is possible in the job ticket setting screen 100 in FIG. 8 that the user wants to reuse the job ticket, when the function of the finisher directly connected to the printer is recovered from the error condition, after the processing by the function of the finisher, which is included in the post-press unit 40 and can be independently utilized, has been completed. Therefore, in the job ticket setting screen 100 in FIG. 8, check boxes 102 are provided for recovering the original setting, after the processing has been completed.

FIG. 11 is a configuration diagram of an example of a job ticket. In FIG. 11, a content for turning off the stapling function of the finisher directly connected to the printer and for causing an alternative stapler to staple has been set in the job ticket indicated by (A), so that the stapling process is performed by the function of the finisher, which is included in the post-press unit 40 and can be independently utilized. After the stapling process has been completed by the alternative stapler, the job ticket is restored to the original setting, as shown in the job ticket indicated by (B) in FIG. 11. The job ticket indicated by (B) in FIG. 11 may be reused, after the function of the finisher directly connected to the printer has recovered from the failure.

According to the embodiment, when there is abnormality in a function of a finisher directly connected to a printer, or when the function does not exist in the finisher directly connected to the printer, if a corresponding function exists in a finisher, which is included in the post-press unit 40 and can be independently utilized, it is possible to notify an end user of availability of the function of the finisher in the post-process, by setting a corresponding item in the overwrite print setting to "OFF" in the process administration unit 20.

The present invention is not limited to the specifically disclosed embodiments, and variations and modifications may be made without departing from the scope of the present invention.

The present application is based on Japanese Priority Application No. 2011-106996 filed on May 12, 2011, the entire contents of which are hereby incorporated herein by reference.

What is claimed is:

1. A non-transitory computer readable recording medium storing a print job generating program that, when executed, causes a computer to perform as:

a setting unit configured to perform a print job ticket setting process for a desired post-processing function, the print job ticket setting process including designating, by a first user, a setting for the desired post-processing function to be included in a print job ticket; and a print job generating unit configured to generate a print job, based on the setting for the desired post-processing function that is set using the setting unit, wherein, in a print system environment that executes a process based on the print job ticket including information about an image to be printed and instruction information that specifies a content of post-processing, the setting unit is configured to allow a second user to set a first setting for not performing a first process, regardless of a print setting included in the print job ticket, in the print system environment for a first function of a first post-processing device included in an image forming device, an unavailability of the first function of the first process being temporarily ignored by the image forming device such that the print job ticket is accepted by the image forming device even though the first setting for not performing the first process is included in the print job ticket, wherein the setting unit is configured to allow the first user to set, alternatively to the first process of the first function, a second process performed by a second function of a second post-processing device included in the print system environment, the setting for the desired post-processing function is accepted by determining which one of the first post-processing device and the second post-processing device receives the setting for the desired post-processing function, the determining being based on whether the setting for the desired post-processing function is set to the first setting, a status of the first function of the first post-processing device, and a status of the second post-processing device and, when there is abnormality in the first function of the first post-processing device included in the image forming device and the first function is not available, the first setting for not performing the first process having been made for the first function, the setting unit notifies the first user of a reason for the unavailability of the first function, and concurrently the setting unit notifies the first user of availability of the second process performed by the second function of the second post-processing device included in the print system environment, alternatively to the first process of the first function of the first post-processing device included in the image forming device.

2. The non-transitory computer readable recording medium according to claim 1, wherein, when the first function of the first post-processing device included in the image forming device is in a normal state and is available, the first setting for not performing the first process having been made for the first function, the setting unit notifies the first user of unavailability of the first function due to an instruction from the print system environment, and concurrently the setting unit notifies the first user of availability of the second process performed by the second function of the second post-processing device included in the print system environment, alternatively to the first process of the first function of the first post-processing device included in the image forming device.

3. The non-transitory computer readable recording medium according to claim 1, wherein, when the setting unit is configured to allow the second user to set the second process performed by the second function of the second post-processing device included in the print system environment, alternatively to the first process of the first function of the first post-processing device included in the image forming device, the first setting for not performing the first process having been made for the first function, the setting unit is configured to allow the second user to select the second post-processing device included in the print system environment from a post-processing device selection list indicating post-processing devices other than the first post-processing device, the post-processing devices being included in the print system environment.

4. The non-transitory computer readable recording medium according to claim 1, wherein, when the first setting for not performing the first process, regardless of the print setting included in the print job, is cancelled in the print system environment, the print job generating unit appends first information to the print job, wherein the first information causes the first process performed by the first function of the first post-processing device included in the image forming device to be recovered.

5. A print job generating device comprising:

a processor including a setting unit configured to perform a print job ticket setting process for a desired post-processing function, the print job ticket setting process including designating, by a first user, a setting for the desired post-processing function to be included in a print job ticket; and the processor including a print job generating unit configured to generate a print job, based on the setting for the desired post-processing function that is set using the setting unit, wherein, in a print system environment that executes a process based on the print job ticket including information about an image to be printed and instruction information that specifies a content of post-processing, the setting unit is configured to allow a second user to set a first setting for not performing a first process, regardless of a print setting included in the print job, in the print system environment for a first function of a first post-processing device included in an image forming device, an unavailability of the first function of the first process is temporarily ignored by the image forming device such that the print job ticket is accepted by the image forming device even though the first setting for not performing the first process is included in the print job ticket, wherein the setting unit allows the first user to set, alternatively to the first process of the first function, a second process performed by a second function of a second post-processing device included in the print system environment, the setting for the desired post-processing function is accepted by determining which one of the first post-processing device and the second post-processing device receives the setting for the desired post-processing function, the determining being based on whether the setting for the desired post-processing function is set to the first setting, a status of the first function of the first post-processing device, and a status of the second post-processing device and, when there is abnormality in the first function of the first post-processing device included in the image forming device and the first function is not available, the first setting for not performing the first process having been made for the first function, the setting unit notifies the first user of a reason for the unavailability of the first function, and concurrently the setting unit notifies the first user of availability of the second process performed by the second function of the second post-processing device included in the print system environment, alternatively to the first process of the first function of the first post-processing device included in the image forming device.

6. A print system comprising:

a processor including a print job generating device; and the processor including a process management device, wherein the print job generating device includes the processor including a setting unit configured to perform a print job ticket setting process for a desired post-processing function, the print job ticket setting process including designating, by a first user, a setting for the desired post-processing function to be included in a print job ticket; and the processor including a print job generating unit configured to generate a print job, based on the setting for the desired post-processing function that is set using the setting unit, wherein, in a print system environment that executes a process based on the print job including information about an image to be printed and instruction information that specifies a content of post-processing, the setting unit is configured to allow a second user to set a first setting for not performing a first process, regardless of a print setting included in the print job, in the print system environment for a first function of a first post-processing device included in an image forming device, an unavailability of the first function of the first process is temporarily ignored by the image forming device such that the print job ticket is accepted by the image forming device even though the first setting for not performing the first process is included in the print job ticket, wherein the setting unit allows the first user to set, alternatively to the first process of the first function, a second process performed by a second function of a second post-processing device included in the print system environment, the setting for the desired post-processing function is accepted by determining which one of the first post-processing device and the second post-processing device receives the setting for the desired post-processing function, the determining being based on whether the setting for the desired post-processing function is set to the first setting, a status of the first function of the first post-processing device, and a status of the second post-processing device and, when there is abnormality in the first function of the first post-processing device included in the image forming device and the first function is not available, the first setting for not performing the first process having been made for the first function, the setting unit notifies the first user of a reason for the unavailability of the first function, and concurrently the setting unit notifies the first user of availability of the second process performed by the second function of the second post-processing device included in the print system environment, alternatively to the first process of the first function of the first post-processing device included in the image forming device.

7. The print system according to claim 6,
wherein the process management device is connected to the image forming device, the first post-processing device, and the second post-processing device.

* * * * *